(12) United States Patent
Thompson

(10) Patent No.: US 8,052,366 B2
(45) Date of Patent: Nov. 8, 2011

(54) ATTACHMENT FOR FASTENER DRIVEN BY POWDER CHARGE SETTING TOOL

(75) Inventor: William J. Thompson, Newport Beach, CA (US)

(73) Assignee: Tomarco Contractor Specialties, Inc., La Mirada, CA (US)

( * ) Notice: Subject to any disclaimer, the term of this patent is extended or adjusted under 35 U.S.C. 154(b) by 0 days.

(21) Appl. No.: 12/565,628

(22) Filed: Sep. 23, 2009

(65) Prior Publication Data

US 2011/0068239 A1  Mar. 24, 2011

(51) Int. Cl.
F16B 15/00 (2006.01)
(52) U.S. Cl. ...................................................... 411/441
(58) Field of Classification Search .............. 411/441, 411/999, 440
See application file for complete search history.

(56) References Cited

U.S. PATENT DOCUMENTS

| | | | |
|---|---|---|---|
| 3,289,522 A * | 12/1966 | Bell | 411/371.2 |
| 3,382,751 A | 5/1968 | Kofpf | |
| 3,491,933 A | 1/1970 | Thurner et al. | |
| 3,516,323 A | 6/1970 | O'Brien | |
| 3,552,625 A | 1/1971 | Udert | |
| 3,556,379 A | 1/1971 | Bayer et al. | |
| 3,589,584 A | 6/1971 | Ohlsson et al. | |
| 3,622,060 A | 11/1971 | Gussalli | |
| 3,675,838 A | 7/1972 | Bakoledis | |
| 3,851,416 A | 12/1974 | Engström et al. | |
| 3,915,242 A | 10/1975 | Bell | |
| 3,973,708 A | 8/1976 | Scotoni | |
| 4,028,986 A * | 6/1977 | Beton | 411/440 |
| 4,063,672 A | 12/1977 | Jochum | |
| 4,066,199 A | 1/1978 | Jochum et al. | |
| 4,114,792 A | 9/1978 | Pomeroy | |
| 4,687,126 A | 8/1987 | Brosius et al. | |
| 4,804,127 A | 2/1989 | Kirkman | |
| 5,425,488 A | 6/1995 | Thompson | |
| 5,429,291 A | 7/1995 | Thompson | |
| 5,443,345 A * | 8/1995 | Gupta | 411/441 |
| 5,569,010 A | 10/1996 | Janssen et al. | |
| 5,624,220 A * | 4/1997 | Janssen et al. | 411/441 |
| 5,833,420 A * | 11/1998 | Schmidle et al. | 411/441 |
| 6,547,120 B1 | 4/2003 | Popovich et al. | |
| 6,688,829 B1 * | 2/2004 | Popovich et al. | 411/441 |
| 6,789,364 B2 * | 9/2004 | Popovich et al. | 52/506.01 |
| 6,824,342 B2 * | 11/2004 | Gassmann et al. | 411/441 |
| 6,981,630 B2 | 1/2006 | Popovich et al. | |
| 7,182,565 B2 * | 2/2007 | Buytaert et al. | 411/441 |
| 7,326,016 B2 * | 2/2008 | Durig | 411/441 |
| 7,575,139 B2 * | 8/2009 | Thompson | 227/10 |
| 2005/0035172 A1 | 2/2005 | Popovich et al. | |
| 2007/0053768 A1 | 3/2007 | Durig | |

OTHER PUBLICATIONS

Wikipedia: Prismatoid; website http://en.wikipedia.org/wiki/Prismatoid; accessed Sep. 8, 2009; 2 pages.

* cited by examiner

*Primary Examiner* — Flemming Saether

(57) ABSTRACT

A connector of frangible material for mounting on the piercing end of a nail-like fastener, connects the fastener to a bracket or clamp. The bracket has a conical frustrum-shaped aperture. The connector has a conical frustrum-shaped leading end that fits into the conical frustrum-shaped aperture in the bracket. The trailing end of the connector grips the fastener. The connector locks to the bracket by passing its trailing end through the leading opening of the conical frustrum-shaped aperture and snugging the conical frustrum leading end of the connector into the conical frustrum-shaped aperture in the bracket.

8 Claims, 2 Drawing Sheets

ATTACHMENT FOR FASTENER DRIVEN BY POWDER CHARGE SETTING TOOL

BACKGROUND OF THE INVENTION

1. Field of the Invention

The present invention relates generally to improvements in attachment mechanisms for attaching objects to hard surfaces, and more particularly pertains to new and improved connectors wherein the connector attaches a fastener to a bracket prior to the fastener being driven into the hard surface by a powder charge setting tool.

2. Description of Related Art

In the field of attachment mechanisms for fasteners driven by powder charged setting tools, it has been the practice to employ a connector member which attaches to a bracket by a leading end interference fit with a hole in the bracket. The trailing end of the connector member is mounted on the piercing end of a nail like fastener. The connector provides an expendable temporary connection between the nail fastener and the bracket to be fastened prior to driving the fastener into the supporting surface and securing the bracket. One example of such a device can be found in U.S. Pat. No. 4,028,986 granted Jun. 14, 1977 to Richard J. Beton.

Because of stability problems during the drive cycle associated with the kind of connector described in the Beton patent, others have attempted to solve these problems by adding a plastic foot to the connector to increase the surface area of the connector that contacts the hard surface into which the fastening element is driven. An example of this type of attachment member is shown and described in U.S. Pat. No. 5,624,220 granted Apr. 29, 1997 to Janssen et al. The solution described in Janssen et al. adds a separate element to the attachment member, increasing complexity and cost while not solving all problems associated with these devices. All the prior art connector devices have a problem of the constituent part separating during shipment. That is, the nail comes loose from the connector, and the connector comes loose from the bracket. This creates undesired labor time in the field required to assemble the parts. The present application overcomes these problems.

SUMMARY OF THE INVENTION

The leading end of frangible connector mates with a frustum shaped aperture in a bracket. The trailing end of the connector mounts on the pointed end of a fastener. The bracket preferably has a conical frustum shaped aperture at one end and a hold-down or tie-down means at the other end. The conical frustum has a larger opening on the leading side and a smaller opening on the trailing side of the bracket foot. The conical frustum aperture is formed to receive a conical frustum leading end of a connector when the connector, trailing end first, is passed through the conical frustum aperture at the leading side of the bracket foot. The connector is shaped to grasp the bracket at the small opening trailing side of the bracket foot, after the conical frustum leading end of the connector is snugged into the conical frustum-shaped aperture on the leading side of the bracket foot.

BRIEF DESCRIPTION OF THE DRAWINGS

The exact nature of this invention, as well as the objects and advantages thereof, will become readily apparent upon consideration of the following specification in conjunction with the accompanying drawings, in which like reference numerals designate like parts throughout the figures thereof, and wherein.

DETAILED DESCRIPTION OF THE PREFERRED EMBODIMENTS

Figure 3:
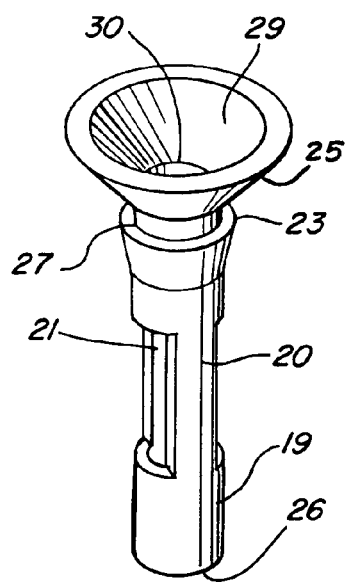
FIG. 3 is a perspective of the connector according to an embodiment of the present invention.

The connector 19, that is part of the attachment of the present invention, is shown in FIG. 3 as having a cylindrical body 20 with slots 21 in the exterior surface. Although slots are shown, these openings may be holes or any other shaped opening in the exterior surface of the cylindrical body, in order to increase the frangibility of the connector 19. The connector 19 is preferably made of a frangible plastic, nylon, or metal material, or any other material having equivalent properties, allowing it to be flattened under the force of a fastener being driven into a hard surface.

The leading end 25 of the connector 19 is shaped as a conical frustum with the larger opening 29 at the leading edge and the smaller opening 30 at its trailing edge. The smaller opening diameter matches the diameter of the cylindrical body 20 of the connector 19. The trailing edge 26 of the connector 19 is also open.

Although the leading edge of connector 19 is shown as being a conical frustum, as the preferred embodiment, it may also be a frustum of other shapes, such as a pyramid, or cupola, or any other structure that is shaped similarly.

A ridge 23 is located just below the trailing end of the conical frustum 25 with a space 27 between the trailing end of the frustum 25 and the ridge 23 around the diameter of the cylindrical connector 19. The space is about the length of the thickness of a bracket 104. The ridge functions to lock the connector 19 to the bracket 104 in a manner which will be explained hereinafter.

Figure 4:
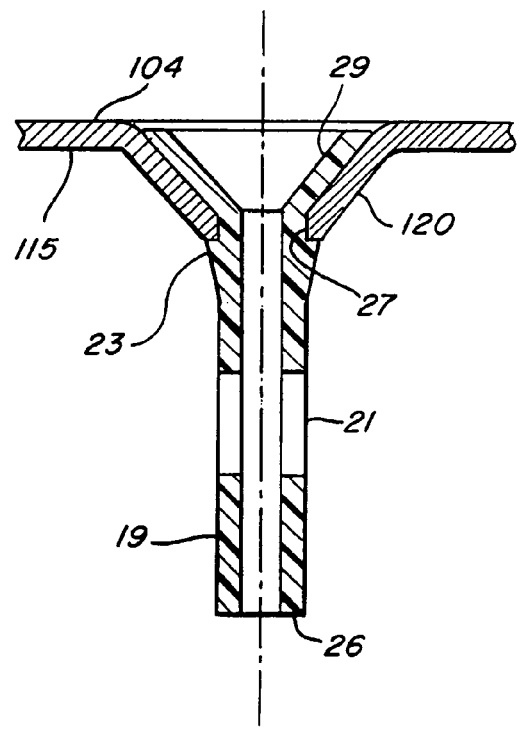
FIG. 4 is a cross-sectional view of the connector attached to a bracket, according to an embodiment of the present invention.
Figure 5:
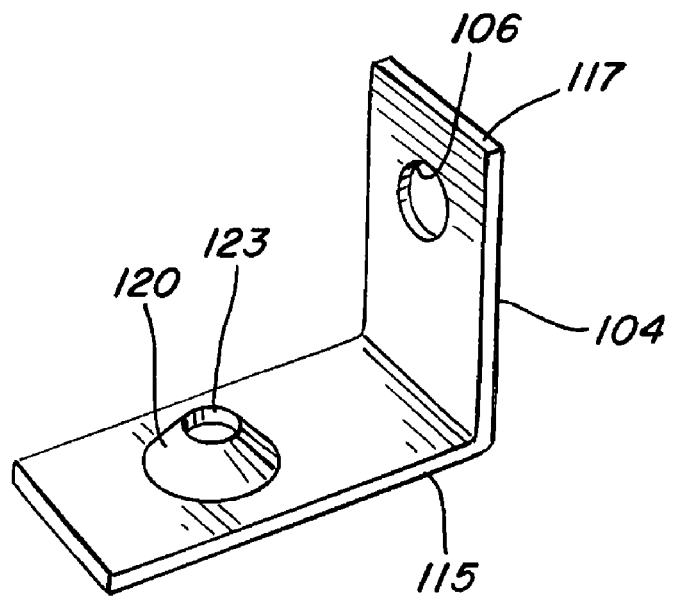
FIG. 5 is a perspective view of an embodiment of the bracket, according to the present invention.

A preferred bracket 104 is illustrated in FIG. 5 as having an L-shape with a flat leg 117 at right angles to another flat leg 115. The flat leg 117 has an aperture 106 therein to which wires and other attachments may be made. The other flat leg 115 is the bracket foot. It contains a frustum-shaped aperture 120 with the smaller opening 123 at its trailing side and a larger opening (not shown) at its leading side. The frustum-shaped aperture 123 in bracket foot 115 is sized to accommodate the shape of frustum 25 on the leading end of connector 19, as shown in FIG. 4.

The connector 19 is passed through the larger opening on the leading side of bracket foot 115 by inserting the trailing end 26 of the connector so that it passes through the trailing opening 123 of frustum aperture 120, until the frustum 25 of the connector 19 snugs into frustum aperture 120 on bracket 104, and the ridge 23 on connector 19 snaps over the trailing opening 123 in the trailing side of bracket foot 115, thereby securely fastening the connector 19 to the bracket 104 at the bracket foot 115.

Figure 1:
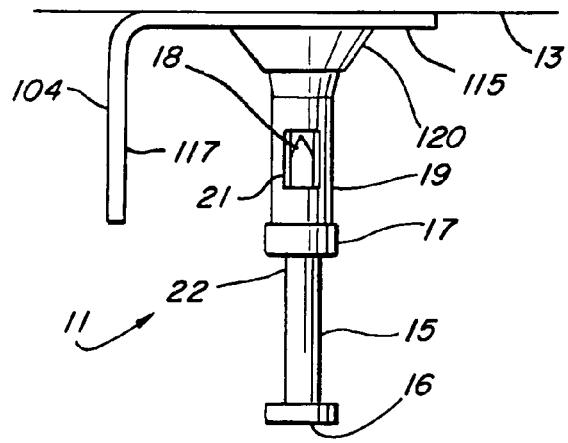
FIG. 1 is a left side view of an embodiment of the present invention.
Figure 2:
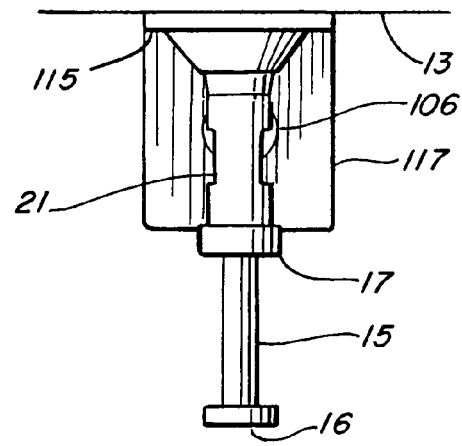
FIG. 2 is a front view of the embodiment shown in FIG. 1.

An full assembly of the attachment of the present invention is shown demonstrated in FIGS. 1 and 2. FIG. 1 shows assembly 11 having the connector 19 attached to the bracket 104, with a fastener 15 having its shank 22 inserted into the trailing end 26 of connector 19, at its pointed end 18. Fastener 15 on shank 22 has a head 16 at the other end of point 18. A washer 17, which is preferably frangible, rides on the shaft 22 of fastener 15 between the head 16 and the trailing end 26 of connector 19, for the purpose which will be described herein below.

Figure 6:
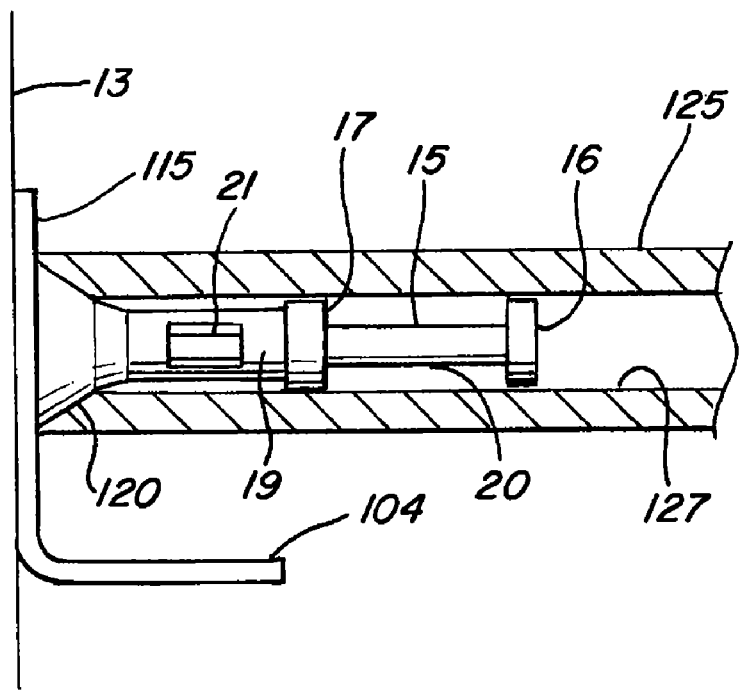
FIG. 6 is a side view, in partial perspective, of the attachment of the present invention loaded in a barrel of a setting tool.

FIG. 6 illustrates the attachment of the present invention located in a barrel 125 of an explosive operating setting tool (not shown). The barrel 125 has a bore 127 of a diameter that accommodates the head 16 of the fastener 15 and the outside diameter of the cylindrical body 20 of connector 19. The washer 17 located on the shank 22 of fastener 15 is sized to snuggly fit within the bore 127 of barrel 125 in order to centrally locate the shank 22 of fastener 15 along the center line of the bore 127, from the start of the fastener 15 drive cycle, until it is secured into the hard surface 13. During the drive cycle, the frangible washer 17 and frangible connector 19 collapse on the trailing side of the bracket foot 115 of bracket 104.

The frustum-shaped aperture 120 in the flat surface of bracket foot 115 creates a stabilizing footprint that provides perpendicular guidance to the fastener 15 during the entire drive cycle. By enabling the fastener 15 to enter the hard surface 13 in this manner, substrate penetration is greatly improved without causing concrete spalling or partial penetration that occurs as the result of an off angle penetration.

What is claimed is:

1. An attachment to be secured to a hard surface including a fastener to be driven into the hard surface by an explosive operated setting tool, the fastener having an axially extending shank with a tip at a leading end and a head at a trailing end, a connector having an axially extending body with a leading and trailing end, laterally enclosing at least the tip of the fastener at its trailing end, and a bracket having a leading and trailing side, the trailing side engaged by the leading end of the connector, the leading side of the bracket engaging the hard surface, wherein the improvement comprises the leading end of the connector shaped as a conical frustum, with a smaller top of the conical frustum positioned between a larger top of the conical frustum and the trailing end of the connector, the bracket having a conical frustum-shaped aperture with the larger opening of the conical frustum-shaped aperture on the leading side of the bracket and the smaller opening on the trailing side of the bracket, the conical frustum-shaped aperture being sized to receive the conical frustum on the connector.

2. The attachment of claim 1 wherein the connector has a ridge around its body spaced a slight distance from the smaller top of the conical frustum, the ridge slightly overlaying the trailing side of the bracket.

3. The attachment of claim 2 wherein the ridge contacts the trailing side of the bracket to lock the bracket against the smaller top of the conical frustum.

4. The attachment of claim 1 wherein the connector body has at least one aperture along its axial dimension.

5. The attachment of claim 1 wherein the connector is frangible.

6. The attachment of claim 1 wherein the size of the connector body is smaller than the internal diameter of a barrel in a setting tool.

7. The attachment of claim 6 further comprising a frangible washer on the shank of the fastener, the washer sized to fit snuggly within the internal diameter of the barrel of the setting tool.

8. The attachment of claim 1 wherein the bracket is shaped for attaching to other objects for holding them against the hard surface.

* * * * *